April 30, 1963 E. C. ROGERS, JR 3,087,379
COMBINED LIGHT METER AND SIGHTING DEVICE
Filed Jan. 6, 1958 2 Sheets-Sheet 2
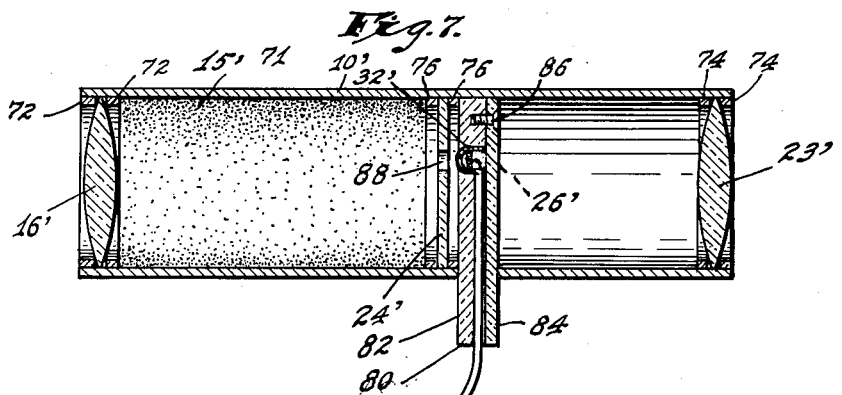
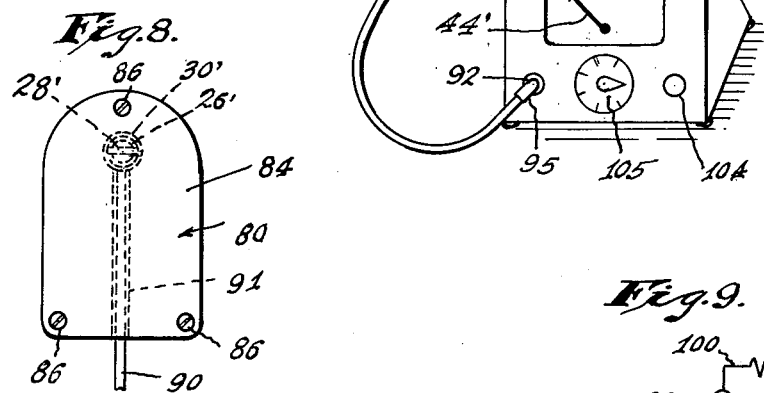
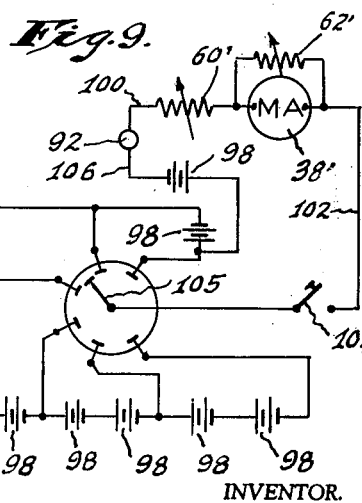
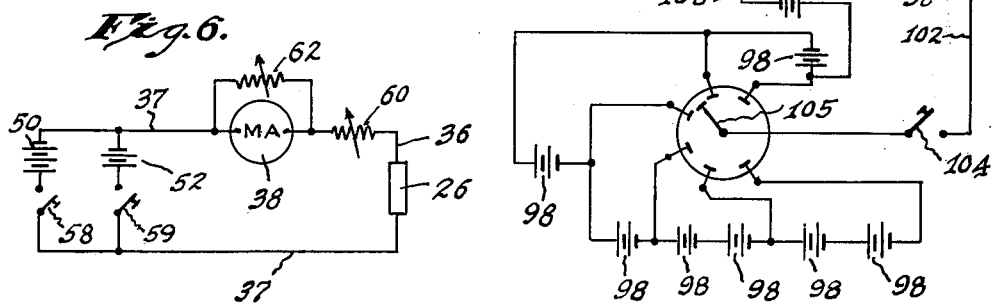
INVENTOR.
Elwood C. Rogers Jr.
BY
Schley, Nash & Jenkins
ATTORNEYS.

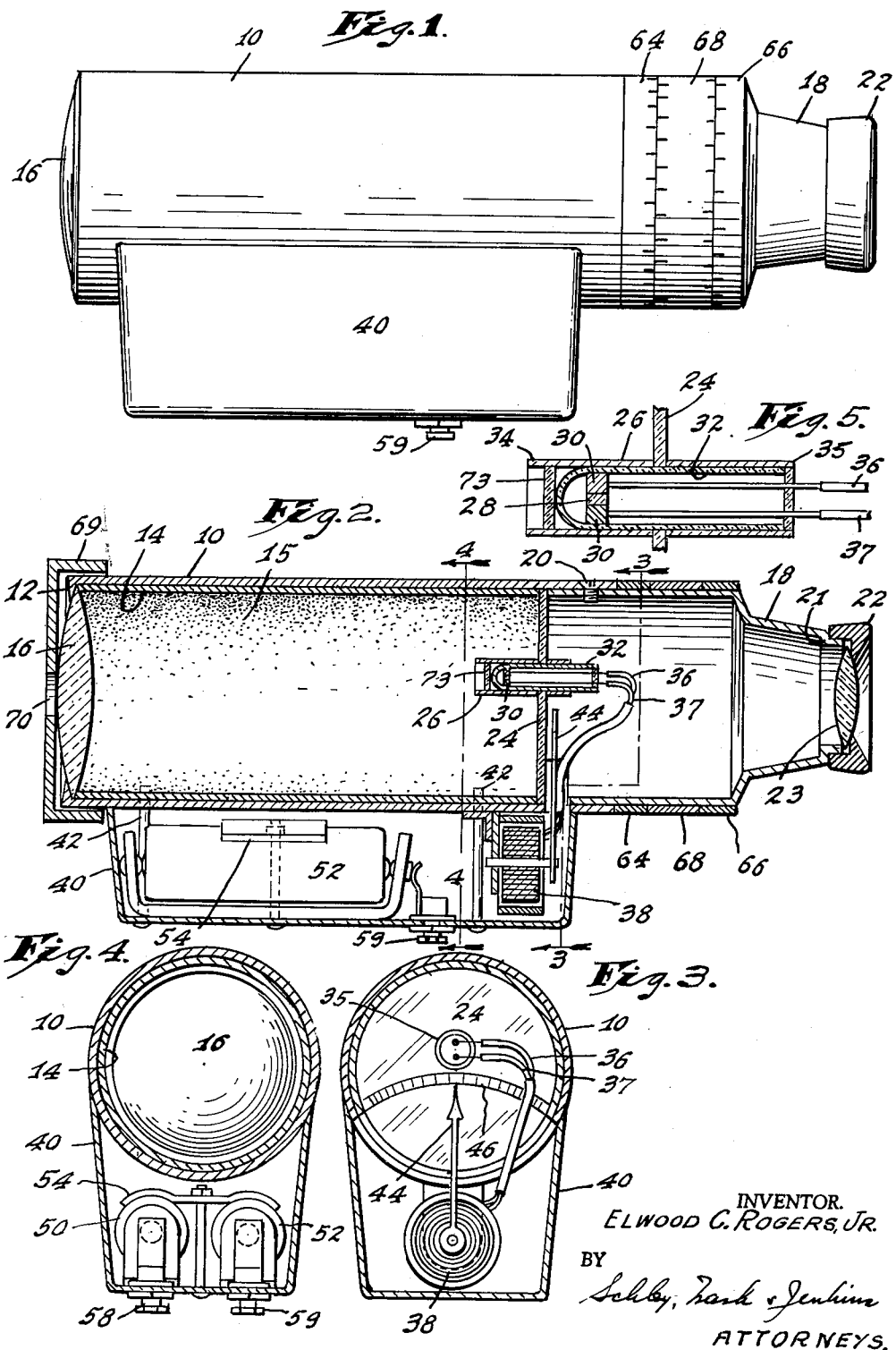

United States Patent Office 3,087,379
Patented Apr. 30, 1963

3,087,379
COMBINED LIGHT METER AND SIGHTING DEVICE
Elwood C. Rogers, Jr., Indianapolis, Ind., assignor to Fotomatic Corporation, Indianapolis, Ind., a corporation of Indiana
Filed Jan. 6, 1958, Ser. No. 707,238
3 Claims. (Cl. 88—23)

This invention relates to a light measuring device, and more particularly to a light measuring device of the type commonly known and referred to as a light meter.

Light meters heretofore available have used the light energy falling upon them as the only source of power for their operation. Consequently they employ large light acceptance angles, in the range of 25° to 75°, which limit their use to an integrating type of light measurement in which they are actuated by all of the light received within these large acceptance angles. This produces a measurement of the average reflected light values of all of the objects forming a distant scene and provides no means for measuring the light values of the individual objects within that scene. Because these instruments produce only average reflected light value measurements, the sensitivity of such instruments must be calibrated for an average range of light values, which makes them incapable of measuring the reflected light values of either extremely light or extremely dark objects.

It is the general object of my invention to provide a light meter which will overcome the difficulties and disadvantages described above. More specifically, it is an object of my invention to provide a light meter which will measure both reflected and incident light values, and which will measure the reflected light values of individual distant objects without being influenced by their surrounding backgrounds. It is another object of my invention to provide a light meter which will measure light intensities over a wide range of values, and which will be extremely sensitive over its entire range of measurement.

In one preferred form of my invention, an objective lens at one end of a housing receives and focuses a light beam rearwardly through the housing toward an eye-piece mounted at the opposite end of said housing. A photo-sensitive element is mounted within the housing between the objective and eyepiece lenses, preferably in an image plate desirably in the form of a diffuser. The photo-sensitive element is connected in series in a meter indicating circuit containing an electrical power source and a microammeter, and controls the current in such circuit in response to the light received by it. The microammeter registers the amount of light received by said photosensitive element, and its scale is preferably positioned on the image plate.

Desirably, the power source embodies a plurality of batteries of different voltages conveniently wired in parallel and individually switched for imposing different voltages upon the indicating circuit. With this arrangement the light meter is operative over a plurality of ranges of light values depending on the voltage imposed on the circuit, and so that actuation of the photo-sensitive element by both bright and dark objects will, with selected switch closings, produce readings within the operative range of the microammeter. Adjustable resistance elements may be connected in the meter indicating circuit for standardizing and calibrating the meter readings.

The accompanying drawings illustrate my invention. In such drawings:

FIG. 1 is an elevation of a light meter embodying my invention;

FIG. 2 is a longitudinal section of the light meter shown in FIG. 1;

FIG. 3 is a vertical section taken on the line 3—3 of FIG. 2;

FIG. 4 is a vertical section taken on the line 4—4 of FIG. 2;

FIG. 5 is an enlarged longitudinal section of the photo-sensitive element shown in FIG. 2;

FIG. 6 is a wiring diagram of the light meter shown in FIG. 1;

FIG. 7 is a modified form of my invention in which the optical system is contained in a light probe, shown in section, which is connected by an electric cord to a meter housing, shown in perspective;

FIG. 8 is an enlarged rear elevation of the photo-sensitive element carrier used in the modification of FIG. 7; and FIG. 9 is a wiring diagram of the light meter shown in FIG. 7.

The light meter shown in FIG. 1 comprises a tubular housing 10 conveniently formed from a light weight metal, such as aluminum, with its forward end bent inwardly to form a circumferential lip 12. A convex objective lens 16 is mounted in the forward end of the housing 10 with its circumferential margin retained against the lip 12 by the forward end of a tubular sleeve 14 disposed within the housing 10. Desirably, the inner face of the sleeve 14 is treated, as with black felt flox 15, to reduce the internal light reflections within the meter. A tapered eye-piece holder 18 is secured to the opposite or rear end of the housing as by screws 20. The end of the holder 18 is shouldered at 21 for the reception of a cap 22 adapted to hold a magnifying eye-piece lens 23 between the cap 22 and the holder 18. The focused light beam passing through the lens 16 is projected on an image plate 24 conveniently in the form of a frosted glass diffuser secured in the housing 10 by the adjacent ends of the sleeve 14 and the eye-piece holder 18. Preferably, the sleeve 14 extends rearwardly from the objective lens 16 a sufficient distance to dispose the image plate 24 slightly rearwardly of the focal length of the lens 16 so that the light beam focused through the objective lens 16 will produce a real inverted image upon the image plate 24 which can be observed by a viewer looking through the eye-piece 23.

As shown in FIG. 5, a photo-sensitive cell 26, preferably a photo-conductive element, is mounted in the image plate 24. The cell comprises a photo-sensitive crystal 28 formed from an iron core vapor-plated with a suitable photo-conductive material, such as cadmium selenide, and carried between a pair of semi-circular metallic members 30. The cadmium selenide plating sensitizes the crystal to light so that any light falling on the crystal will cause said crystal to become electrically conductive, the amount of conductivity developed being directly proportional to the amount of light falling on the crystal. To prevent moisture and dust from contacting the crystal and thereby affecting its sensitivity, the crystal 28 carried between the members 30 is encased in a transparent casing 32 conveniently an encasement formed from an epoxy resin, a hermetically sealed glass tube, or the like. A pair of darkened plastic sleeves 34 and 35 are disposed around the casing 32 with the adjacent ends of said sleeves abutting the fore and aft faces of the image plate 24 to secure the cell in an opening cut in said plate. Desirably, the sleeve 34 extends well forwardly of the end of the casing to exclude any light from the crystal that may be reflected from the inner walls of the sleeve 14.

The crystal 28 is connected by wires 36 and 37 to the meter indicating circuit comprising a microammeter 38 mounted below the image plate 24 in a carriage 40 secured to the side wall of the housing 10 by screws 42. The ammeter 38 is provided with a pointer 44 extending upwardly through openings in the bottom of the housing 10 and eye-piece holder 18 to register with a light intensity scale 46 on the rearward face of the image plate 24. Thus, an observer looking through the eye-piece 23 can observe on the plate 24 the real inverted image of the object being observed and can simultaneously observe the light value of the object as measured by the pointer 44 on the scale 46. Where the object being measured is relatively small and at relatively great distance from the light meter, its image may be partially or wholly obscured by the photo-sensitive cell 26 and the observer may be able to view only the background objects adjacent the object being measured, but this will still show precisely what portion of the scene is being measured.

Power for the light meter is supplied by a pair of batteries 50 and 52 connected in the indicating circuit between the ammeter 38 and cell 26 by the wire 37, and releasably mounted in a conventional battery clip 54 secured to the casing 40. Preferably, the batteries 50 and 52 are standard voltage mercury-type batteries, each having a different absolute voltage. For example, the battery 50 may have a voltage of 2.1 volts and the battery 52 a voltage of 2.7 volts. The lower voltage battery 52 is used to energize the meter indicating circuit for measuring a range of high intensity light values produced by relatively bright objects which render the photosensitive cell 26 more conductive and thus reduce the internal resistance in the meter indicating circuit. The high voltage battery 50 is used to energize the indicaitng circuit for measuring a range of low intensity light values produced by relatively dark objects which render the photo-sensitive cell 26 less conductive than relatively bright objects. Conveniently, the batteries 50 and 52 are wired in parallel and are individually controlled by normally open switches 58 and 59 mounted on the lower face of the carriage 40. With this arrangement, the switches 58 and 59 may be selectively closed to actuate either one of the batteries 50 and 52 for imposing the desired voltage on the indicating circuit. Further, if one of the batteries should fail the other battery is still operable to provide a source of power for the indicating circuit to permit the light meter to remain operative over the light value range of the battery remaining operative.

As illustrated in the wire diagram in FIG. 4, there is provided an adjustable resistance element 60 in series in the indicating circuit. In producing my light meters the resistance elements 60 are adjusted with respect to the crystals 28 with which they are employed so that the resistance imposed upon the indicating circuit of each light meter will be the same when each of the meters is exposed to the same light intensity. That is, adjustment of the element 60 controls the slope of the light measurement curve which is produced by plotting the light intensity versus resistance in the indicating circuit. Additional calibration is provided by a second adjustable resistance element 62 in parallel with the microammeter 38 to control the amount of current that can flow through said ammeter. By proper adjustment of the resistance element 62, the amount of current flowing through the ammeter can be calibrated so that two light meters measuring the same object will produce identical meter readings on the scale 46. That is, the element 62 controls the displacement of the light intensity curve described above.

Conveniently, I have provided a pair of scale rings 64 and 66 fixedly secured on the eye-piece holder 18 and having indicia registerable with indicia on a slip ring 68 rotatable on the holder 18 between the rings 64 and 66. By properly aligning the indicia on the several rings the readings on the scale 46 can be converted into the desired units for determining shutter speeds and lens openings for a plurality of different types of cameras, such as still cameras, movie cameras, television cameras, etc.

The rings 64, 66 and 68 may be provided further with scales for converting the readings on the scale 46 into camera settings for use with films having different speeds, for color and black and white film, for movie film, etc.

Conveniently, in order to increase the limits of the operative ranges of the meter a lens cover 69 having a centrally disposed opening 70 may be slipped over the end of the housing 10 in which the objective lens 16 is mounted. As will be understood, such a cover restricts the amount of light entering the meter and thereby reduces the amount of light falling on the photo-sensitive element 26. For example, if a cover having an opening one tenth as large as the frontal area of the lens 16 is placed over the end of the housing, the amount of light reaching the element 26 will be reduced by a like amount. This permits the meter to be used for measuring light values that would otherwise fall beyond the upper limits of the meter's sensitivity. Similarly, when the meter is being used to measure incident light values, a light diffusing filter is placed over the objective lens, and when it is desired to sensitize the meter to a desired color sensitivity a color filter may be disposed over the objective lens. Alternatively, in sensitizing the color sensitivity of the meter a color filter 73 may be mounted in the sleeve 34 to sensitize the cell 26 to the desired color without altering the color of the image that is observed in the diffuser 24.

The embodiment of my invention just described is primarily adapted for portable use where the light values measured are within a range of say .05–128,000 foot lamberts. A modified form of my invention adapted for measuring a wider range of light values is shown in FIG. 7.

In this modification, there is provided a light probe 71 comprising a tubular housing 10' having its inner walls treated with black flox 15' to reduce internal light reflections within said housing. An objective lens 16' is mounted in the forward end of the housing 10' by a pair of rings 72 and focuses a light beam rearwardly through the housing toward a magnifying eye-piece lens 23' mounted in the rearward end of the housing 10' by a pair of rings 74. Interposed between the objective and eye-piece lenses 16' and 23' in the housing 10' is an image plate 24' retained therein, as by rings 76. Desirably the plate 24' is spaced from the objective lens 16' at a distance slightly greater than the focal length of said lens so that a real inverted image is produced on the plate which can be seen by an observer looking through the eye-piece 23'. Conveniently, the eye-piece lens 23' may be omitted from this construction if desired, however, its omission would permit dirt and other foreign matter to enter the rear end of the probe 71.

A photo-sensitive cell 26', preferably a photo-conductive element, is encased in a transparent carrier 80 adapted to be inserted in an opening cut in the housing 10' immediately rearwardly of the image plate 24'. As in the previously described embodiment of my invention, the photocell 26' comprises a photo-sensitive crystal 28' formed from an iron core vapor-plated with a suitable photo-conductive material, such as cadmium selenide, and mounted between a pair of semicircular metallic members 30'. The carrier 80 is formed from a transparent material, such as that sold under the trademark "Lucite," and embodies a pair of members 82 and 84 rigidly secured together as by screws 86. The crystal 28' carried between the members 30' is disposed in a transparent casing 32' desirably formed from an epoxy resin and positioned in the forward carrier member 82 so that upon insertion of the carrier 80 into the housing 10' the crystal will be aligned with an opening 88 formed in the plate 24'. Electrical leads 90 from the crystal 28' extend downwardly through a channel 91 in the carrier member 82 and terminate in a jack 95 adapted to be received in a jack-socket 92 disposed in a meter housing 93 carrying the indicating circuit for the light probe 71.

As shown in FIGS. 7 and 9, a microammeter 38' is mounted in the housing 93 with its pointer 44' movable across a scale 46' conveniently disposed on the face of the housing 93. A plurality of standard voltage mercury-type batteries 98 are disposed in the housing 93 to provide the source of electrical power for the indicating circuit. In the embodiment shown, I employ eight such batteries having different voltages ranging from 1.3 volts to 37 volts. As previously described, when the instrument is being used to measure the light intensity of a relatively dark object the higher voltage batteries are employed to energize the indicating circuit, and when the instrument is being used to measure the light intensities of relatively brighter objects the lower voltage batteries are employed.

As illustrated in the wiring diagram in FIG. 9, the batteries 98 are connected and switched in a manner to permit the desired voltage to be imposed on the indicating circuit. To this end, the jack-socket 92 for light probe 71 is connected, as by a wire 100, through an adjustable resistance element 60' to the microammeter 38'. The opposite side of the ammeter is connected by a wire 102 through an off-on switch 104 mounted on the face of the housing 93 to a six-way switch 105 also mounted on the housing face and adapted to selectively control the batteries 98 for energizing the indicating circuit with the desired voltage. As shown, each of the contacts on the switch 105 is connected through a battery, or series of batteries, to a lead 106 connected to the side of the jack-socket 92 opposite the ammeter lead 100. By closing the switch 104 and actuating the switch 105, any one of six different voltages may be imposed on the indicating circuit.

Conveniently, as previously described in the other modification of my invention, an adjustable resistance element 60' may be interposed in the circuit between the jack-socket 92 and the ammeter 38' to calibrate the circuit for variations in the slopes of the light measurement curves that may be produced by crystals having different sensitivities; and a second such adjustable resistance element 62' may be wired in parallel with the ammeter to standardize the amount of current that may flow through said ammeter, and thereby control the displacement of the light measurement curve.

I claim as my invention:

1. A light meter, comprising a housing having an objective lens at one of its ends adapted to focus the light from an object to be measured through said housing, a photo-conductive element carried in said housing in the path of the focused light of said objective lens, an eye-piece mounted at the housing end opposite the objective lens in spaced relation to said photo-conductive element, the inner walls of said housing being coated with felt flox between said objective lens and the photo-conductive element, and an indicating circuit connected to said photo-conductive element and including a micro-ammeter having a scale in the line of sight through said housing and an electric power source whereby actuation of said photo-conductive element by the focused light will directly control the amount of current flowing to said microammeter from the power source to produce a microammeter reading proportional to the intensity of the focused light energizing the photo-conductive element, said power source including a plurality of individually controllable batteries wired in parallel and having different voltages to impose different electrical potentials on the indicating circuit for measuring a plurality of ranges of light intensities.

2. A light meter, comprising a housing having an objective lens at one of its ends adapted to focus the light from an object to be measured through said housing toward an eye-piece at the opposite housing end, a photo-conductive element carried in said housing in the path of the focused light of said objective lens and in spaced relation to said eye-piece, an indicating circuit connected to said photo-conductive element and including a microammeter and an electric power source connected in series with said photo-conductive element and supplying electrical energy to said circuit whereby the focused light will control the amount of current flowing to said microammeter from the power source to produce a microammeter reading proportional to the intensity of the focused light energizing the photo-conductive element, a pair of adjustable resistance elements in said meter indicating circuit for calibrating said circuit to control the light measurement curve that is produced by plotting light intensity versus resistance in the indicating circuit, one of said resistance elements being in series with said photo-conductive element and microammeter to control the slope of said curve and the other of said resistance elements being in parallel with said microammeter to control the displacement of said curve, and a switch for actuating said power source.

3. A light meter, comprising a housing having an objective lens at one of its ends adapted to focus the light from an object to be measured through said housing toward an eye-piece at the opposite housing end, a photo-conductive element carried in said housing in the path of the focused light of said objective lens and in spaced relation to said eye-piece, said photo-conductive element being sealed in a transparent casing, an indicating circuit connected to said photo-conductive element and including a microammeter and an electric power source connected in series with said element and supplying power to said circuit whereby actuation of said photo-conductive element by the focused light will control the resistance of said circuit to control the amount of current flowing to said microammeter from the power source to produce a microammeter reading proportional to the intensity of the focused light energizing the photo-conductive element, and a switch for actuating said power source, said casing being removably carried in an opening in said housing whereby upon insertion of said casing into said housing said photo-conductive element is disposed in alignment with an opening cut in an image plate mounted in the housing, said image plate being mounted in said housing at a distance from the objective lens slightly greater than the focal length of the objective lens.

References Cited in the file of this patent

UNITED STATES PATENTS

| | | |
|---|---|---|
| 1,244,159 | Adsit | Oct. 23, 1917 |
| 1,980,217 | Moreno | Nov. 13, 1934 |
| 2,013,363 | Riszdorfer | Sept. 3, 1935 |
| 2,113,450 | Lasky et al. | Apr. 5, 1938 |
| 2,293,576 | Townsley | Aug. 18, 1942 |
| 2,422,273 | Wannamaker | June 17, 1947 |
| 2,699,086 | Finch | Jan. 11, 1955 |

FOREIGN PATENTS

| | | |
|---|---|---|
| 935,219 | France | Feb. 2, 1948 |